(12) United States Patent
Blatter (10) Patent No.: US 11,420,614 B2
(45) Date of Patent: Aug. 23, 2022

(54) ANTI-JERK ENGAGEMENT

(71) Applicant: Dr. Ing. h.c. F. Porsche Aktiengesellschaft, Stuttgart (DE)

(72) Inventor: Benjamin Blatter, Wiernsheim-Serres (DE)

(73) Assignee: Dr. Ing. h.c. F. Porsche Aktiengesellschaft, Stuttgart (DE)

(*) Notice: Subject to any disclaimer, the term of this patent is extended or adjusted under 35 U.S.C. 154(b) by 310 days.

(21) Appl. No.: 16/659,602

(22) Filed: Oct. 22, 2019

(65) Prior Publication Data

US 2020/0130671 A1 Apr. 30, 2020

(30) Foreign Application Priority Data

Oct. 29, 2018 (DE) .................... 10 2018 126 877.7

(51) Int. Cl.
*B60W 20/15* (2016.01)
*H02K 7/02* (2006.01)
*B60W 30/20* (2006.01)
*B60W 10/08* (2006.01)
*B60W 10/06* (2006.01)

(52) U.S. Cl.
CPC ............ *B60W 20/15* (2016.01); *B60W 10/06* (2013.01); *B60W 10/08* (2013.01); *B60W 30/20* (2013.01); *H02K 7/02* (2013.01)

(58) Field of Classification Search
CPC .................................................. B60W 20/15
See application file for complete search history.

(56) References Cited

U.S. PATENT DOCUMENTS

| 6,102,144 A * | 8/2000 | Lutz | ......................... B60K 6/48 |
| | | | 903/917 |
| 6,859,693 B2 | 2/2005 | Tamagawa et al. | |
| 2003/0177846 A1* | 9/2003 | Tamagawa | .............. G01M 1/30 |
| | | | 73/862.29 |
| 2012/0053770 A1* | 3/2012 | Kretschmer | ............ B60L 15/20 |
| | | | 180/65.265 |

(Continued)

FOREIGN PATENT DOCUMENTS

| CN | 100402336 C | * | 7/2008 | |
| CN | 103354790 B | * | 4/2016 | ............. B60K 6/445 |

(Continued)

*Primary Examiner* — Shelley Chen
(74) *Attorney, Agent, or Firm* — Leydig, Voit & Mayer, Ltd.

(57) ABSTRACT

A control device for a vehicle having a plurality of torque sources provided on an axle includes a plurality of control outputs configured to allow control signals to be output to individual torque sources of the plurality of torque sources and in order to influence the torque generated by the torque sources. The control device is configured to perform an anti-jerk function configured, in dependence on a rotational speed of at least one of the torque sources, to determine a countertorque value for an engagement, in order to reduce oscillations in a longitudinal movement of the vehicle. The control device is configured to carry out a splitting function configured to split the countertorque value into at least two partial countertorque values. The control device is also configured to output the control signal at different control outputs in dependence on the respectively assigned partial countertorque values.

11 Claims, 5 Drawing Sheets

(56) References Cited

U.S. PATENT DOCUMENTS

2014/0336885 A1* 11/2014 Bang .................. B60L 50/16
                                                          701/53
2015/0053165 A1    2/2015  Christ et al.

FOREIGN PATENT DOCUMENTS

| | | | | |
|---|---|---|---|---|
| CN | 108068659 A | * | 5/2018 | ............ B60L 15/20 |
| DE | 19721298 A1 | * | 11/1998 | ............ B60K 6/48 |
| DE | 19721298 A1 | | 11/1998 | |
| DE | 10313338 A1 | * | 10/2003 | ............... G01L 3/02 |
| DE | 102004039756 A1 | * | 2/2006 | ........... B60W 10/06 |
| DE | 102004039756 A1 | | 2/2006 | |
| DE | 102005015484 A1 | * | 5/2006 | ........... B60W 10/08 |
| DE | 102005015484 A1 | | 5/2006 | |
| DE | 102006036217 A1 | | 2/2008 | |
| DE | 102006036217 A1 | * | 2/2008 | ............ B60L 50/16 |
| DE | 10313338 B4 | | 4/2008 | |
| DE | 102010039701 A1 | | 3/2012 | |
| DE | 102010039701 A1 | * | 3/2012 | ............... B60K 6/48 |
| DE | 102012206559 A1 | | 10/2013 | |
| DE | 102012206559 A1 | * | 10/2013 | ........... B60W 50/00 |
| EP | 2423065 A2 | * | 2/2012 | ............... B60K 6/48 |
| FR | 2935660 A1 | * | 3/2010 | ........... B60K 6/442 |
| JP | 2013151194 A | * | 8/2013 | |
| JP | 2016002991 A | * | 1/2016 | |
| JP | 2016002991 A | | 1/2016 | |
| WO | WO-2008015041 A1 | * | 2/2008 | ........... B60W 20/11 |

* cited by examiner

ANTI-JERK ENGAGEMENT

CROSS REFERENCE TO RELATED APPLICATIONS

This application claims benefit to German Patent Application No. DE 10 2018 126 877.7, filed Oct. 29, 2018, which is hereby incorporated by reference herein.

FIELD

The invention relates to a control device, in particular a control device for a vehicle having a plurality of torque sources.

SUMMARY

In an embodiment, the present invention provides a control device for a vehicle having a plurality of torque sources provided on an axle. The control device includes a plurality of control outputs configured to allow control signals to be output to individual torque sources of the plurality of torque sources and in order to influence the torque generated by the torque sources. The control device is configured to perform an anti jerk function configured, in dependence on a rotational speed of at least one of the torque sources, to determine a countertorque value for an engagement, in order to reduce oscillations in a longitudinal movement of the vehicle. The control device is configured to carry out a splitting function configured to split the countertorque value into at least two partial countertorque values. The control device is also configured to output the control signal at different control outputs in dependence on the respectively assigned partial countertorque values, in order to distribute the engagement of the anti jerk function to a plurality of the torque sources.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

The invention provides control devices for vehicles having a plurality of torque sources.

A control device according to the invention for a vehicle having a plurality of torque sources provided on an axle has a plurality of control outputs in order to allow control signals to be output to the individual torque sources and in order to influence the torque generated by the torque sources. The control device is designed to carry out an anti-jerk function, which anti jerk function is configured, in dependence on a rotational speed of at least one of the torque sources, to determine a countertorque value for the engagement, in order to reduce oscillations in the longitudinal movement of the vehicle. The control device is designed to carry out a splitting function, which is configured to split the countertorque value into at least two partial countertorque values. The control device is designed to output the control signal at different control outputs in dependence on the respectively assigned partial countertorque value, in order to distribute the engagement of the anti jerk function to a plurality of the torque sources.

The splitting of the countertorque value into a plurality of partial countertorque values for a plurality of torque sources allows a large countertorque engagement and thus a high level of dynamics. This is helpful particularly in very sporty situations in which an individual torque source reaches the actuating limit, that is to say can only partially carry out the desired engagement.

According to a preferred embodiment, the control device is configured to output a control signal in dependence on the partial countertorque values at least temporarily only at a part of the control outputs which are assigned to the torque sources of an axle, in order to effect the engagement of the anti jerk function via a subgroup of the torque sources assigned to the axle. Certain torque sources can for example be more poorly suited to effect countertorques, and such torque sources can be completely or partially excluded from the generation of the countertorque. If certain torque sources are more environmentally friendly than others, they can preferably be used to generate the countertorque, and additional torque sources can be added only when a large countertorque is required.

According to a preferred embodiment, the control device is configured to output a control signal in dependence on the partial countertorque values at least temporarily at all the control outputs which are assigned to the torque sources of an axle, in order to effect the engagement of the anti-jerk function via all of the torque sources assigned to the axle. In this way, a large countertorque with a high level of dynamics can be generated.

According to a preferred embodiment, the control device has a first input for receiving a first value characterizing the rotational speed of a torque source, and the anti jerk function is configured to determine the countertorque value in dependence on the double derivation of the time profile of the first value, preferably with subsequent use of a bandpass filter. This execution of the anti jerk function requires few input values, and countertorques can be readily calculated.

According to a preferred embodiment, the control device has a first input for receiving a first value characterizing the rotational speed of one of the torque sources, and it has a second input for receiving a second value characterizing the rotational speed of the axle, and the anti jerk function is configured to determine the countertorque value in dependence on a difference-forming in which the first value or a third value derived from the first value is on a first side and the second value or a fourth value derived from the second value is on a second side. With this execution of the anti jerk function, too, a suitable countertorque can be calculated in a preferable manner.

According to a preferred embodiment, the torque sources provided on an axle have at least one first torque source and at least one second torque source, which first torque source is connected to the second torque source via a dual-mass flywheel, and which second torque source is drive-connected to the axle, in order to allow a torque generated by the first torque source to be transmitted via the dual-mass flywheel and the second torque source to the axle, and in which control device the splitting function is configured to weight the first torque source more strongly than the second torque source in the splitting of the countertorque value into the at least two partial countertorque values. Since the first torque source also applies a torque to the second torque source via the dual-mass flywheel, the stronger use of the first torque source makes it possible to achieve a greater effect than if the first torque source is only little influenced and only the second torque source is used to generate the countertorque.

According to a preferred embodiment, the splitting function is configured to carry out the splitting of the countertorque value into the at least two partial countertorque values in dependence on the torque setpoint value. The magnitude of the torque setpoint value is usually correlated with the current power, and the jerk problem can be greater in the case of higher powers. It is therefore advantageous to carry out the splitting in dependence on the torque setpoint value. Here, the torque setpoint value can be either the request of the driver, for example by way of the accelerator pedal or the cruise control, or the filtered torque setpoint value downstream of a filter, in particular a load shock damping filter.

According to a preferred embodiment, the splitting function is configured to carry out the splitting of the countertorque value into the at least two partial countertorque values in dependence on the time derivation of the periodic change of the accelerator pedal position. If a driver quickly presses the accelerator pedal, which corresponds to a high value of the time derivation or a large driver's wish gradient, a large change in torque is requested. Relatively large jerk effects occur here, and an adaptation of the splitting of the countertorque is therefore advantageous.

According to a preferred embodiment, the torque sources have a first torque source and a second torque source, and the splitting function is configured to output the control signals up to a predetermined magnitude of the countertorque value in such a way that the countertorque is output exclusively via the first torque source, and to output the control signals upon exceeding the predetermined magnitude of the countertorque value in such a way that the countertorque is output both via the first torque source and via the second torque source. In the case of small countertorques, it is sufficient if only one of the torque sources is used. In addition, there are certain torque sources which are for example more environmentally friendly (for example electric motors as opposed to internal combustion engines). Therefore, it can be advantageous to use only the first torque source at low countertorque values and, by contrast, to use a plurality of torque sources at high countertorque values.

According to a preferred embodiment, the control device is configured to output the control signals at the different control outputs in dependence on the respectively assigned partial countertorque values in such a way that the countertorque is simultaneously generated, at least temporarily, by the torque sources. The torque sources can thus act simultaneously. Here, the control signals can arrive in the torque sources at different times, but the torque sources are simultaneously active, at least temporarily.

Figure 1:
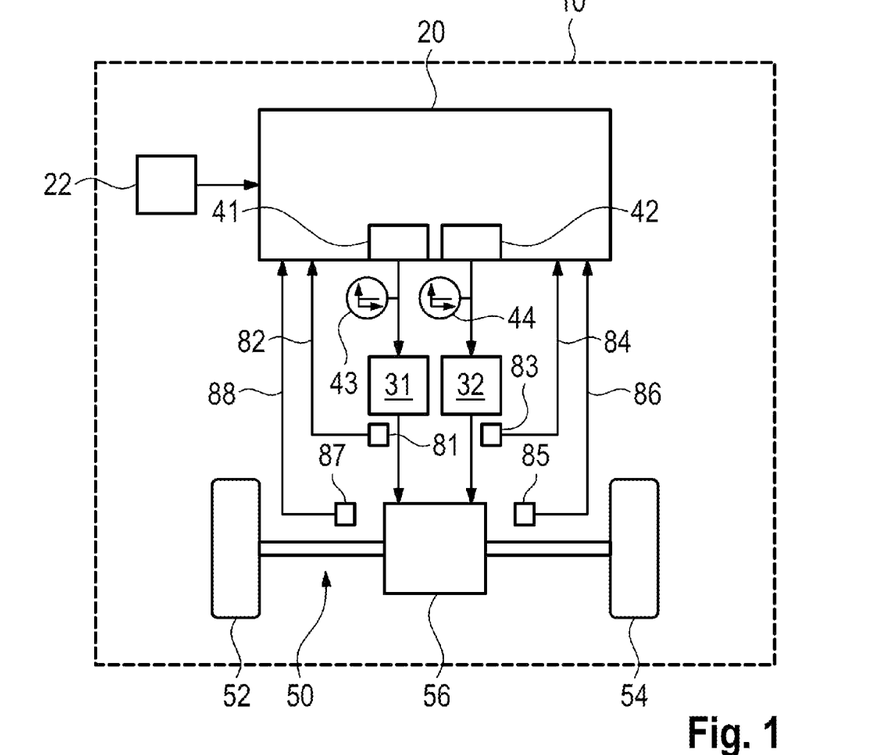
FIG. 1 shows a vehicle having a control device and a plurality of torque sources.

FIG. 1 shows, in a schematic illustration, a vehicle 10 having a drive axle 50 which has two wheels 52, 54. A differential 56 for example is provided between the wheels 52, 54. In the exemplary embodiment, the axle 50 can be driven via two torque sources 31, 32. A control device 20 has two control outputs 41, 42 in order to output control signals 43, 44 to the torque sources 31, 32 and thereby to influence the torque generated by the torque sources 31, 32. An accelerator pedal 22 is connected to the control device 20 in order to transmit thereto a desired value which influences the torque of the torque sources 31, 32. The signal of the accelerator pedal 22 is usually considered as the torque wish of the driver, but it can also be considered as the power wish of the driver.

For example, a rotational speed sensor 81 is provided at the output of the torque source 31 and connected to the control device 20 via a signal line 82. In the same way, a rotational speed sensor 83 is provided for determining the rotational speed of the torque source 32 and connected to the control device 20 via a signal line 84. A rotational speed sensor 85 is provided for determining the rotational speed of the wheel 4 and connected to the control device 20 via a control line 86. A rotational speed sensor 87 is provided for determining the rotational speed of the wheel 52 and connected to the control line 20 via a signal line 88. Alternatively, it is also possible to provide the rotational speed signals via a bus system, for example from another control device, or to use a comparable signal, such as the velocity.

Figure 2:
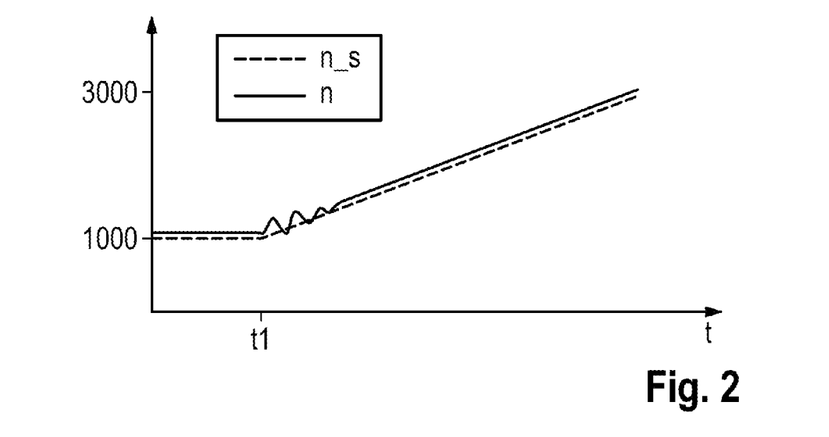
FIG. 2 shows a diagram in which a setpoint rotational speed and a rotational speed resulting therefrom are plotted over time.

FIG. 2 shows for example over time the rotational speed of a torque source 31 in which a higher torque is requested at the time t1. From the higher torque there results an expected increase in the rotational speed corresponding to the curve n_s, which is linear in the exemplary embodiment. By contrast, particularly at the start of the increase in the torque setpoint value, the actual rotational speed n has oscillations which are noticeable as a deviation from the reference rotational speed n_s. These oscillations lead to oscillations of the vehicle in the longitudinal movement of the vehicle and can be felt by the driver. They are perceived as uncomfortable. The oscillations can occur, on the one hand, during strong engine torque changes, but they can also result from tilting movements of the drive train. This effect is known and is referred to as jerk effect.

A so-called anti-jerk function (anti-jerk controller) is known to reduce the jerk effect. The anti jerk function acts as a control circuit, and the torque source is acted on via said circuit in dependence on the oscillations in order to damp the oscillation.

The determination of the countertorque value by the anti jerk function can occur in a number of ways.

A known method is the double derivation of the drive rotational speed of the torque source and preferably a subsequent bandpass filtering. This method is referred to as the D2T2 method.

Another method is the determination of the rotational speed differential between the drive rotational speed and the wheel rotational speed, which is calculated back to the crankshaft level and which is used as reference rotational speed. As an alternative to the wheel rotational speed, the wheel velocity can also be used. This method is referred to as the reference rotational speed control method.

The detected oscillation is optionally multiplied by an amplification factor and applied as countertorque value to the torque source. This is also referred to as anti jerk engagement.

Figure 3:
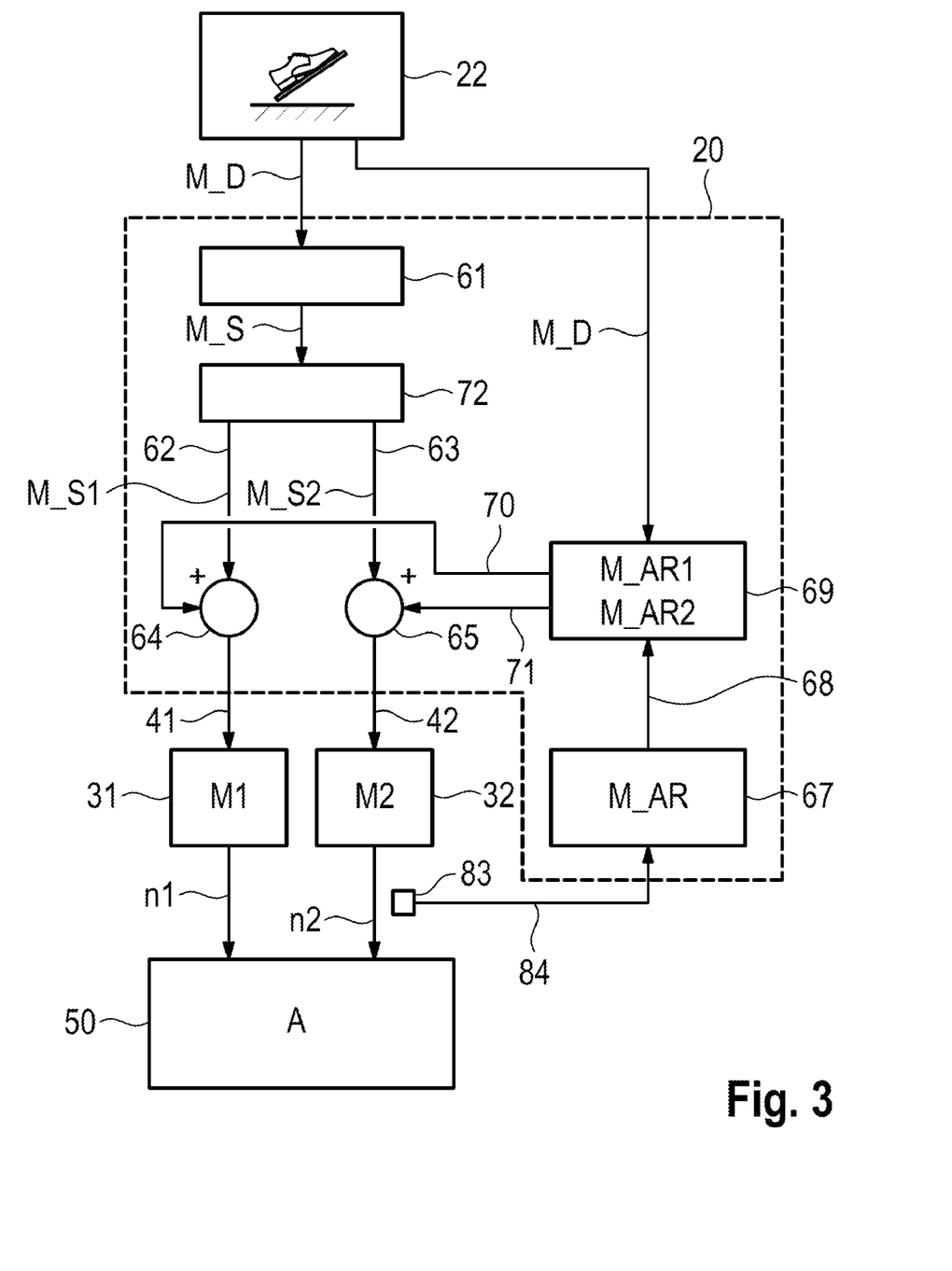
FIG. 3 shows, in a schematic illustration, an exemplary embodiment of a control device.

FIG. 3 shows an exemplary embodiment of the control device 20 in a schematic illustration. An accelerator pedal 22 generates a value M_D, which characterizes the torque wish of the driver. The torque wish M_D can also be referred to as torque wish value, and it is fed to the control device 20. The control device 20, which can also be referred to in general as engine controller, has a filter 61 which filters abrupt changes in the level of the torque request M_D by limiting the flank steepness, for example. Such filters 61 are referred to as load shock damping filters (torque transient), and they constitute a driver's wish filter. The value of the accelerator pedal can thus be referred to as torque wish value, and the value downstream of the filter 61 can be referred to as filtered torque wish value. The load shock damping already brings about a reduction in oscillations by reducing the steepness of the load jumps. The filter 61 generates a filtered torque setpoint value M_S, and the latter is split in a torque distribution device 72 into two setpoint values M_S1 and M_S2. It is thus determined in the torque distribution device 72 which torque is to be generated via which torque source 31, 32. The torque source 31 is for example an internal combustion engine and the torque source 32 is an electric motor, or vice versa. It is also possible for two electric motors to be provided. An output 62 of the torque distribution device 72 is connected to the control output 41 via an adder 64, and an output 63 of the torque distribution device 72 is connected to the control output 42 via an adder 65. The control output 41 is connected to the torque source 31, and the control output 42 is connected to the torque source 32.

The torque source 31 drives the axle 50 at a rotational speed n1, and the torque source 32 drives the axle 50 at a rotational speed n2. Here, there can optionally also be provided a transmission between the respective torque source 31, 32 and the axle 50.

The rotational speed sensor 83 is provided for determining the rotational speed n2 of the torque source 32, and the determined rotational speed signal is fed to the control device 20 via the line 84. The control device 20 has an anti jerk function 67 which calculates a countertorque value M_AR in dependence on the rotational speed value n2 and optional further parameters and forwards said value to a splitting function 69 via a line 68. The splitting function 69 is configured to split the countertorque value M_AR into two partial countertorque values M_AR1 and M_AR2. The partial countertorque value M_AR1 is fed to the adder 64 via a line 70, and the partial countertorque value M_AR2 is fed to the adder 65 via a line 71.

Of course, in each case a subtractor can also be provided instead of the adders 64, 65, and for this purpose the values M_AR1 and M_AR2 can be used by being multiplied by the number −1.

It is possible by means of the control device 20 shown to use both torque sources 31, 32 for the anti jerk function. In this way, the possible dynamics of the anti jerk function are increased, and the jerk effect can be greatly reduced even in extreme driving situations. Here, it should be noted that each torque source 31, 32 has an admissible actuating range which must not be exceeded. The use of both torque sources 31, 32 allows a comparatively high engagement of the anti-jerk function to be achieved. It has been shown that the splitting functions particularly well if the individual torque sources 31, 32 are assigned to a common axle, since in this case identical calculation specifications apply to the drive train oscillations and identical rotational speed oscillations occur.

For the case that the transmission path from the torque sources 31, 32 to the drive train is not identical, since for example a dual-mass flywheel is installed between the torque sources, it is possible to provide an additional direction factor in the splitting function 69, by which factor the torque source functionally further away from the drive train is amplified or the closer torque source is weakened. If thus, for example, an internal combustion engine 31 is connected to an electric motor 32 via a dual-mass flywheel, and the electric motor 32 is connected to the axle 50, the countertorque value is preferably more greatly split toward the internal combustion engine 31 than toward the electric motor 32. This achieves a higher level of dynamics.

Figure 4:
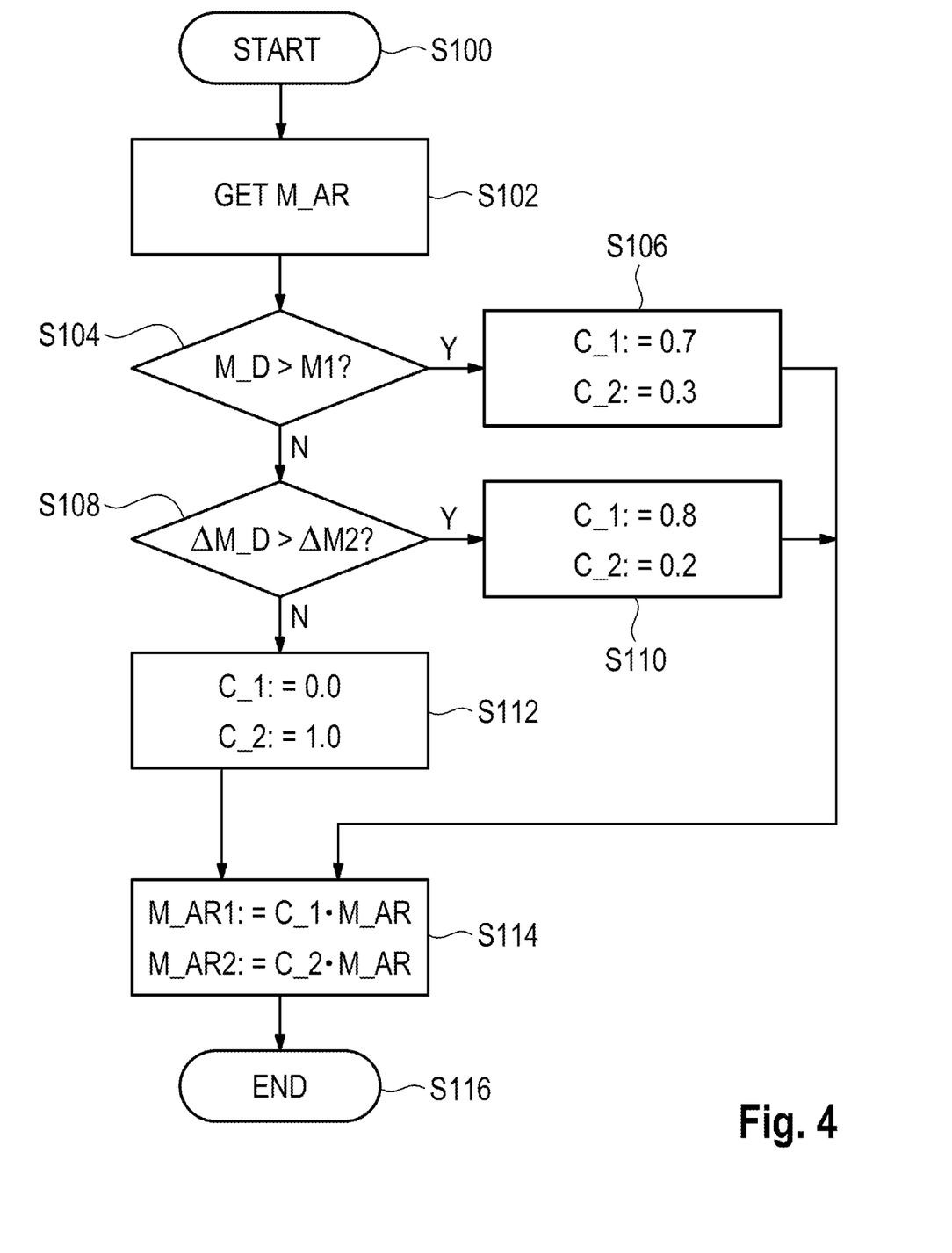
FIG. 4 shows a flow diagram for an exemplary embodiment of a splitting function.

FIG. 4 shows a first exemplary embodiment of the splitting function 69 in the form of a flow diagram. The routine begins at S100 (START), and there occurs a jump to S102. In S102, the countertorque value M_AR is read ("GET M_AR"). In S104, it is checked whether the torque wish M_D of the driver is greater than a value M1, whether thus a large torque is requested. If YES ("Y"), it is assumed that the torque sources 31, 32 are to be operated in a high-power range, and in step 106, a factor C_1 is set to 0.7 and a factor C_2 is set to 0.3. There is then a jump to S114. In the exemplary embodiment, the torque source 31, the proportion of which is determined via the factor C_1, is intended to be able to deliver more torque than the torque source 32, and therefore the torque source 31 is more strongly weighted by the factor 0.7. If the result in S104 was NO ("N"), there occurs a jump to S108, and it is checked whether a value ΔM_D is greater than a value ΔM2. The value ΔM_D characterizes the speed with which the driver has pressed the accelerator pedal 22. If the driver quickly presses the accelerator pedal, a large power request can be assumed. The value ΔM_D can be defined for example as the maximum increase in the value M_D over time when depressing the pedal 22 or as the maximum increase in the value M_D within the last one or two seconds. If the result in S108 is YES, there occurs a jump to S110, and the value C_1 is set to 0.8 and the value C_2 is set to 0.2. There then occurs a jump to S114.

If, by contrast, the result in S108 was NO, there occurs a jump to S112, and the value C_1 is set to 0.0 and the value C_2 is set to 1.0. The countertorque is thus generated only by the torque source 32. This can be advantageous for example if the torque source 32 is more environmentally friendly than the torque source 31, as is the case for example in an electric motor as opposed to an internal combustion engine. There then occurs a jump to S114. The partial countertorque value M_AR1 is determined by multiplying the value C_1 by the countertorque value M_AR, and the partial countertorque value M_AR2 is determined by multiplying the value C_2 by the countertorque value M_AR. There then occurs a jump to S116, and the routine is ended.

It has thus been shown by way of example how the splitting of the countertorque value M_AR can occur in dependence on the position of the accelerator pedal 22 or in dependence on the rotational speed of the accelerator pedal 22. Here, other variants are naturally also possible in which for example both the position of the accelerator pedal 22 and the change in the position of the accelerator pedal 22 go jointly into a determination of the factors C_1, C_2.

Figure 5:
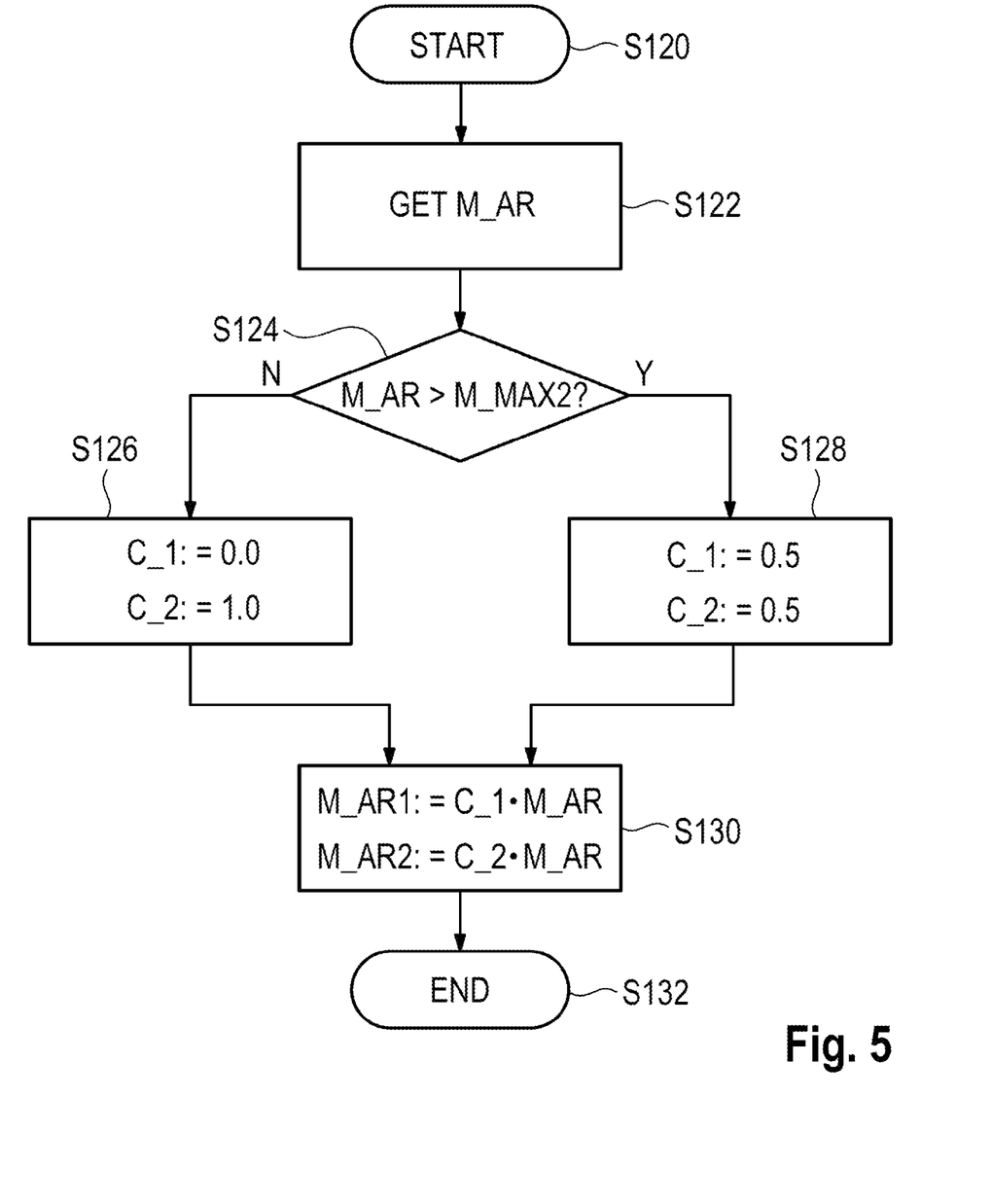
FIG. 5 shows a flow diagram for a further exemplary embodiment of a splitting function.

FIG. 5 shows a further exemplary embodiment of the splitting function 69 of FIG. 3. The routine begins at S120, and in S122 the countertorque value M_AR is read or requested. It is then checked in S124 whether the countertorque value M_AR is greater than a value M_MAX2, which represents the maximum actuating torque of the torque source 32. If YES, that is to say if the countertorque value cannot be generated by the torque source 32 alone, there occurs a jump to S128, and the factors C_1 and C_2 are each set to 0.5, with the result that the countertorque is generated by both torque sources 31, 32. If the answer in S124 is NO, there occurs a jump to S126, where the factor C_1 is set to 0.0 and the factor C_2 is set to 1.0. The countertorque is thus generated completely by the torque source 32. From S126 or S128 there occurs in each case a jump to S130, and the partial countertorque values M_AR1 and M_AR2 are calculated corresponding to FIG. 4. There then occurs a jump to S132, and the routine is ended.

The splitting of the countertorque value among the torque sources 31, 32 can thus also occur in dependence on the magnitude of the countertorque value M_AR.

Naturally, combinations of the exemplary embodiments of FIG. 4 and FIG. 5 are also possible.

In the exemplary embodiments, the sum of the factors C_1 and C_2 in each case gives the value 1.0 in order to symbolize the splitting of the overall countertorque value. However, the sum does not have to give 1.0, and the torque sources 31, 32 customarily have different powers such that further weighting factors or amplification factors come into play.

Figure 6:
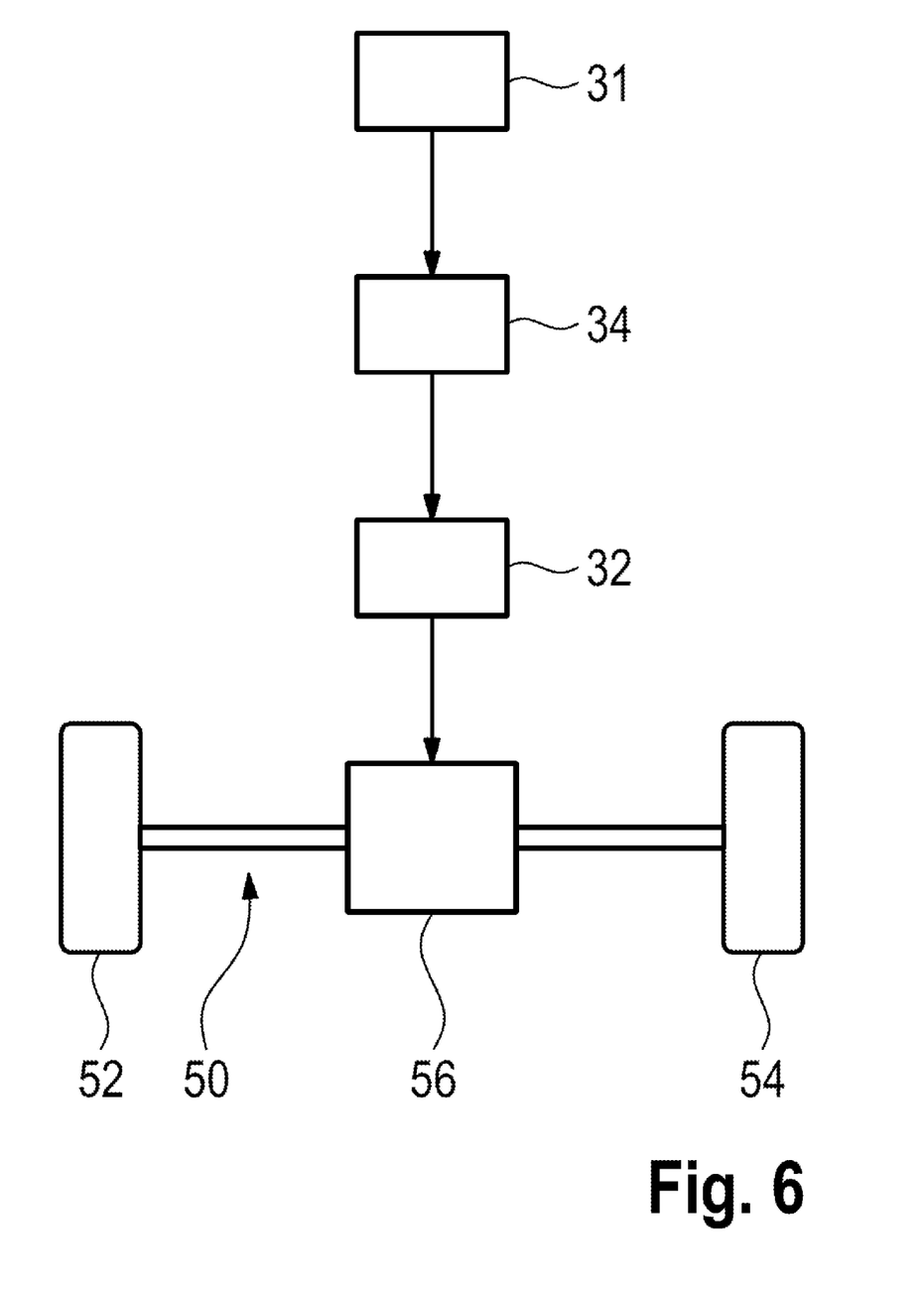
FIG. 6 shows, in a schematic illustration, a vehicle having a first torque source and a second torque source which is coupled via a dual-mass flywheel.

FIG. 6 shows a vehicle having an axle 50. The torque sources provided on the axle have a first torque source 31 and a second torque source 32, which first torque source 31 is connected to the second torque source 32 via a dual-mass flywheel 34. The second torque source 32 is drive-connected to the axle 50 in order to allow a torque generated by the first torque source 31 to be transmitted via the dual-mass flywheel 34 and the second torque source 32 to the axle 50. The splitting function 69 is preferably configured to weight the first torque source 31 more strongly than the second torque source 32 in the splitting of the countertorque value M_AR into the at least two partial countertorque values M_AR1, M_AR2. If the countertorque is generated exclusively via the second torque source 32, it is less effective since the torque generated by the first torque source 31 acts still. Giving preference to the first torque source 31 in the generation of the countertorque makes it possible for the countertorque to act better.

Multiple variations and modifications are of course possible within the scope of the present invention.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

What is claimed is:

1. A control device for a vehicle having a plurality of torque sources provided on an axle, the control device comprising:
    a plurality of control outputs, each respective control output configured to output a control signal to a respective individual torque source of the plurality of torque sources in order to influence the torque generated by the respective torque source; and
    an anti-jerk controller configured to perform an anti-jerk function, the anti-jerk controller configured to:
        determine a rotational speed of at least one of the torque sources,
        determine, in dependence on the rotational speed, a countertorque value for reducing oscillations in a longitudinal movement of the vehicle,
        determine, based on a magnitude of a requested torque and a rate of change of the requested torque, weighting factors for splitting the countertorque value into at least two partial countertorque values;
        split, according to the determined weighting factors, the countertorque value into the at least two partial countertorque values; and
        provide, to each of different respective control outputs, a respective countertorque value of the at least two partial countertorque values in order to distribute the engagement of the anti-jerk function to at least two torque sources of the plurality of torque sources,
    wherein the requested torque is a torque requested, by a driver, from the plurality of torque sources, and
    wherein the determining, based on the magnitude of the requested torque and the rate of change of the requested torque, weighting factors for splitting the countertorque value into at least two partial countertorque values comprises:
        assigning, when the magnitude of the requested torque exceeds a threshold requested torque, a first set of weighting factors;
        assigning, when the magnitude of the requested torque falls below the threshold requested torque and the rate of change of the requested torque exceeds a threshold rate of change, a second set of weighting factors, and
        assigning, when the magnitude of the requested torque falls below the threshold requested torque and the rate of change of the requested torque falls below the threshold rate of change, a third set of weighting factors.

2. The control device as claimed in claim 1, wherein the at least two torque sources are configured to output control signals in dependence on the at least two partial countertorque values in order to effect the engagement of the anti-jerk function via a subgroup of the torque sources assigned to the axle.

3. The control device as claimed in claim 1, wherein the plurality of torque sources consist of the at least two partial torque sources.

4. The control device as claimed in claim 1, further comprising a first input configured to receive a first signal characterizing the rotational speed of the at least one of the torque sources, wherein the countertorque value is determined based on a double derivation of a time profile of a value of the first signal.

5. The control device as claimed in claim 1, further comprising a first input configured to receive a first signal characterizing a rotational speed of the at least one of the torque sources, and
    a second input configured to receive a second signal characterizing a rotational speed of the axle,
    wherein the countertorque value is determined based on a difference between a value of the first signal and a value of the second signal and/or on a difference between a value of a third signal derived from the first signal and a value of a fourth signal derived from the second signal.

6. The control device as claimed in claim 1, wherein the plurality of torque sources includes a first torque source and a second torque source, wherein the first torque source is connected to the second torque source via a dual-mass flywheel, and wherein the second torque source is drive-connected to the axle, in order to allow a torque generated by the first torque source to be transmitted via the dual-mass flywheel and the second torque source to the axle, and wherein a weighting factor assigned to the first torque source is larger than a weighting factor assigned to the second torque source in the splitting of the countertorque value into the at least two partial countertorque values.

7. The control device as claimed in claim 1, wherein the rate of change of the requested torque is determined based on a derivation of an accelerator pedal position as a function of time.

8. The control device as claimed in claim 1, wherein the plurality of torque sources comprises a first torque source and a second torque source, and wherein the weighting factors are determined such that the countertorque is output exclusively via the first torque source for countertorque values below a threshold value and is output both via the first torque source and via the second torque source for countertorque values greater than the threshold value.

9. The control device as claimed in claim 1, wherein the weighting factors are determined such that the countertorque is simultaneously generated, at least temporarily, by the at least two torque sources.

10. The control device as claimed in claim 4, wherein the countertorque value is determined based on the double derivation of the time profile of the value of the first signal with subsequent use of a bandpass filter.

11. The control device as claimed in claim 1, wherein each of the first set of weighting factors, the second set of weighting factors, and the third set of weighting factors specify a respective a ratio of a lowest partial countertorque value to a respective highest partial countertorque value,
    wherein the respective ratio specified by the first set of weighting factors is higher than the respective ratio specified by the second set of weighting factors, and
    wherein the respective ratio specified by the second set of weighting factors is higher than the respective ratio specified by the third set of weighting factors.

\* \* \* \* \*